United States Patent [19]

Odell

[11] Patent Number: 4,655,559

[45] Date of Patent: Apr. 7, 1987

[54] CONDENSATE-FREE GROOMING MIRROR

[76] Inventor: Daniel R. Odell, 43-23rd Ave. #3, Venice, Calif. 90291

[21] Appl. No.: 792,111

[22] Filed: Oct. 28, 1985

[51] Int. Cl.⁴ .......................... G02B 7/18; A45D 27/22
[52] U.S. Cl. ..................................... 350/588; 248/467
[58] Field of Search ........................ 350/588, 582, 639; 248/467, 476, 479; 132/80 A

[56] References Cited

U.S. PATENT DOCUMENTS 3,594,063  7/1971  Smillie, III .......................... 350/588
4,327,961  5/1982  Kladitis ................................ 350/588

Primary Examiner—Jon W. Henry

[57] ABSTRACT

A grooming mirror which is made up of a reflector with a reservior mounted on the back of it. This reservior may be filled with hot liquid in order to heat the mirror and make it condensate-free while the liquid remains above ambient temperature. This mirror unit is provided with and fits into a holster which is mounted on the wall; thereby facilitating the easy removal of the mirror unit for the emptying and recharging thereof. This holster also provides a rack for the storage of grooming articles.

6 Claims, 1 Drawing Figure

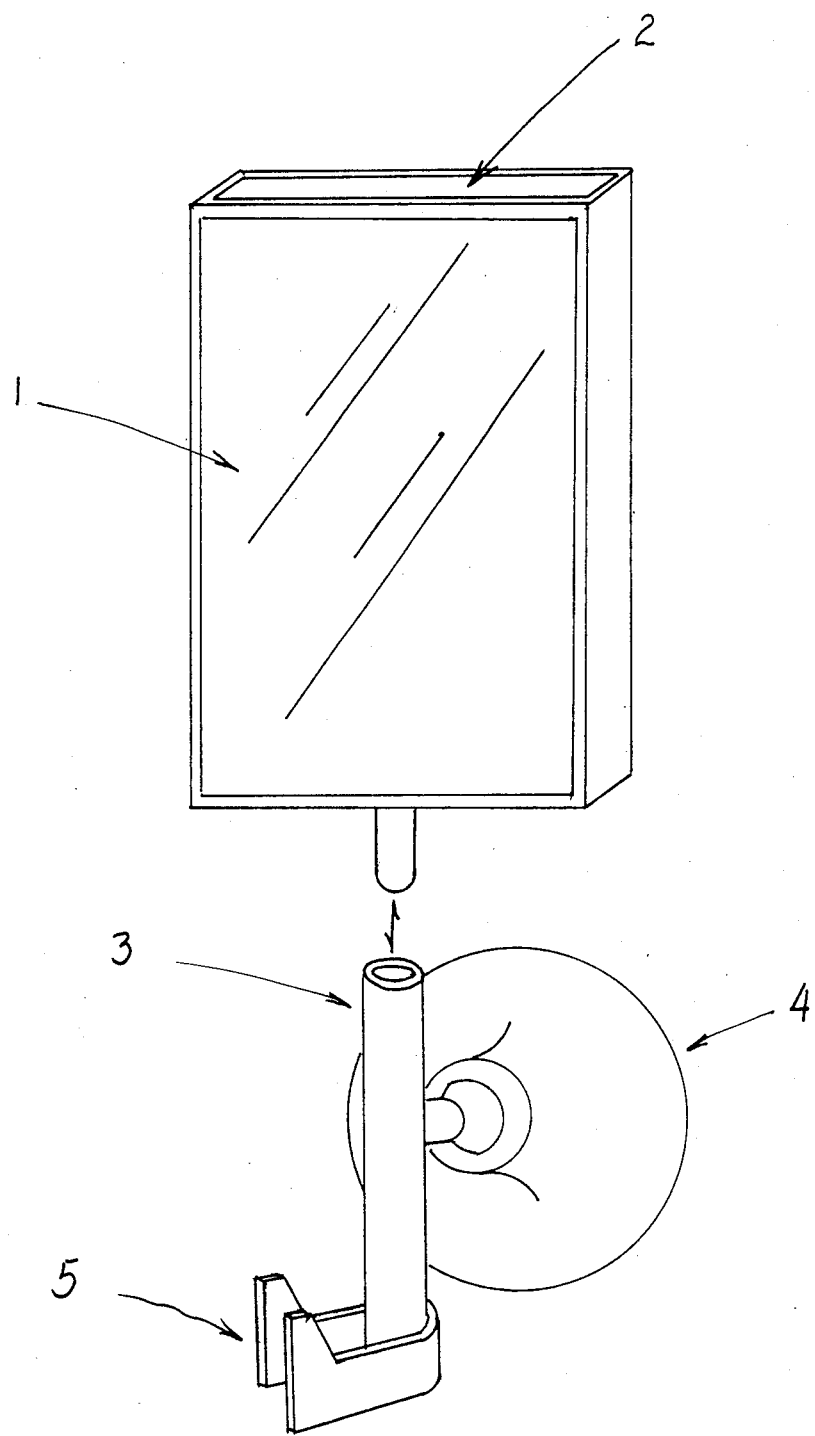

CONDENSATE-FREE GROOMING MIRROR

SUMMARY OF THE INVENTION

The purpose of the invention is to provide a person who shaves or otherwise grooms in a steam-filled environment with a condensate-free mirror that is reliable, easy to use, and safe for the user.

To achieve reliability the invention is provided with a reflector, to which is attached a reservoir to hold hot water (easily obtainable in a steam-filled environment), and thus consistently produce the desired temperature differential on the reflective surface to render it condensate-free.

To achieve ease of filling and emptying of the reservoir, the invention provides a surface mounted holster for said reservoir.

To achieve safety the entire invention is made of shatterproof materials.

DESCRIPTION OF THE DRAWING

FIG. 1 is a frontal perspective.

DETAILED DESCRIPTION OF THE INVENTION

The reservoir (2) is filled with water that is above ambient temperature. The resultant temperature rise of the reflector (1) will surpass the dewpoint of the reflector surface and render said surface condensate-free. The housing with the reflector surface on one side is connected to a support by mating connecting means, for example, a pin and holster (3) connection. The holster (3) is provided with a surface attachment means (4) and a rack (5) for the storage of grooming articles. All parts of the invention are made of shatter-proof materials.

I claim:

1. A liquid heated mirror comprising;
   a housing with an open top defining a reservoir;
   a reflector on one side wall of said housing;
   first connecting means on said housing;
   a support including second connecting means mating with said first connecting means;
   means on said support for attaching said support to a surface,
   whereby in a steam filled environment with said reservoir filled with hot water, condensation on said mirror may be prevented, and said housing may be readily removed from said support to fill or empty said reservoir of water.

2. A liquid heated mirror as recited in claim 1, wherein the pair of connecting means comprise a pin and holster arrangement.

3. A liquid heated mirror as recited in claim 1, wherein said means for attaching includes a suction-cup.

4. A liquid heated mirror as recited in claim 1, wherein said means for attaching includes a ball and socket joint.

5. A liquid heated mirror as recited in claim 1, including a rack secured to said holster for storing grooming articles.

6. A liquid heated mirror art recited in claim 1, entirely made of shatterproof materials.

* * * * *